(12) United States Patent
Ng et al.

(10) Patent No.: US 9,373,144 B1
(45) Date of Patent: *Jun. 21, 2016

(54) DIVERSITY ANALYSIS WITH ACTIONABLE FEEDBACK METHODOLOGIES

(71) Applicant: Cyence Inc., San Mateo, CA (US)

(72) Inventors: George Y. Ng, Dublin, CA (US); Philip A. Rosace, III, San Francisco, CA (US)

(73) Assignee: Cyence Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,510

(22) Filed: Nov. 3, 2015

Related U.S. Application Data

(63) Continuation-in-part of application No. 14/585,051, filed on Dec. 29, 2014, now Pat. No. 9,253,203.

(51) Int. Cl.
  *G06F 21/00* (2013.01)
  *G06Q 40/06* (2012.01)

(52) U.S. Cl.
  CPC ..................................... *G06Q 40/06* (2013.01)

(58) Field of Classification Search
  CPC ........................... H04L 63/1433; G06Q 40/06
  USPC .......................................................... 726/25
  See application file for complete search history.

(56) References Cited

U.S. PATENT DOCUMENTS

| | | |
|---|---|---|
| 6,269,349 B1 | 7/2001 | Aieta et al. |
| 7,047,419 B2 | 5/2006 | Black |
| 7,324,952 B2 | 1/2008 | Hisano |
| 7,680,659 B2 | 3/2010 | Gao et al. |
| 7,711,646 B2 | 5/2010 | Cianciarulo et al. |
| 8,448,245 B2 | 5/2013 | Banerjee et al. |
| 8,468,599 B2 | 6/2013 | McCusker et al. |
| 8,484,066 B2 | 7/2013 | Miller et al. |
| 8,494,955 B2 * | 7/2013 | Quarterman ........... G06Q 40/00 705/38 |
| 8,577,775 B1 | 11/2013 | Gerber |
| 8,601,587 B1 | 12/2013 | Powell et al. |
| 8,699,767 B1 | 4/2014 | Khosla et al. |

(Continued)

FOREIGN PATENT DOCUMENTS

WO    WO2014036396 A1    3/2014

OTHER PUBLICATIONS

Variable Selection for Model-Based Clustering|https://www.stat.washington.edu/raftery/Research/PDF/dean2006.pdf|2006| Raftery et al.|pp. 168-178.*

(Continued)

*Primary Examiner* — Mahfuzur Rahman
(74) *Attorney, Agent, or Firm* — Carr & Ferrell LLP

(57) ABSTRACT

Various embodiments of the present technology relate to diversity and similarity analysis. In some exemplary embodiments, a method includes, for each of a plurality of entities, receiving a set of variables that are indicative of attributes of an entity. The exemplary method also includes comparing the sets of variables for the plurality of entities to each other, locating clusters of similar variables shared between two or more of the plurality of entities, determining a probable maximum loss for the plurality of entities that share the clusters, the probable maximum loss being a loss value attributed to a cyber event against one or more of the shared variables, receiving feedback from an end user in response to providing the probable maximum loss to the end user, and updating the probable maximum loss in response to the feedback.

28 Claims, 9 Drawing Sheets

(56) References Cited

U.S. PATENT DOCUMENTS

| | | |
|---|---|---|
| 9,031,951 B1 | 5/2015 | Baluja et al. |
| 9,253,203 B1 | 2/2016 | Ng |
| 2002/0026335 A1 | 2/2002 | Honda |
| 2002/0091551 A1 | 7/2002 | Parisi |
| 2003/0014344 A1 | 1/2003 | Chacko et al. |
| 2003/0028803 A1* | 2/2003 | Bunker ............... H04L 12/2602 726/4 |
| 2003/0040942 A1 | 2/2003 | Hooten |
| 2003/0084349 A1 | 5/2003 | Friedrichs et al. |
| 2003/0126049 A1* | 7/2003 | Nagan .................... G06Q 40/08 705/35 |
| 2003/0135758 A1 | 7/2003 | Turner |
| 2003/0154393 A1 | 8/2003 | Young |
| 2004/0006532 A1 | 1/2004 | Lawrence et al. |
| 2004/0010709 A1 | 1/2004 | Baudoin et al. |
| 2004/0024693 A1 | 2/2004 | Lawrence |
| 2004/0064726 A1 | 4/2004 | Girouard |
| 2005/0044418 A1 | 2/2005 | Miliefsky |
| 2005/0261943 A1* | 11/2005 | Quarterman ........... G06Q 40/08 705/4 |
| 2005/0278786 A1 | 12/2005 | Tippett et al. |
| 2007/0192867 A1 | 8/2007 | Miliefsky |
| 2008/0016563 A1 | 1/2008 | McConnell et al. |
| 2008/0047016 A1 | 2/2008 | Spoonamore |
| 2008/0167920 A1 | 7/2008 | Schmidt et al. |
| 2008/0250064 A1 | 10/2008 | Duchon et al. |
| 2009/0024663 A1 | 1/2009 | McGovern |
| 2009/0319342 A1 | 12/2009 | Shilman et al. |
| 2010/0114634 A1 | 5/2010 | Christiansen et al. |
| 2010/0205014 A1 | 8/2010 | Sholer et al. |
| 2010/0229187 A1 | 9/2010 | Marwah et al. |
| 2011/0078073 A1 | 3/2011 | Annappindi |
| 2011/0154497 A1 | 6/2011 | Bailey, Jr. |
| 2012/0041790 A1 | 2/2012 | Koziol |
| 2012/0089617 A1 | 4/2012 | Frey |
| 2012/0096558 A1 | 4/2012 | Evrard |
| 2012/0215575 A1 | 8/2012 | Deb et al. |
| 2013/0055404 A1 | 2/2013 | Khalili |
| 2013/0283336 A1 | 10/2013 | Macy et al. |
| 2013/0347060 A1 | 12/2013 | Hazzani |
| 2014/0019171 A1 | 1/2014 | Koziol |
| 2014/0067713 A1 | 3/2014 | Gerber |
| 2014/0067716 A1 | 3/2014 | Gerber |
| 2014/0137257 A1 | 5/2014 | Martinez et al. |
| 2014/0200930 A1 | 7/2014 | Zizzamia et al. |
| 2014/0379708 A1 | 12/2014 | Fox |
| 2015/0088595 A1 | 3/2015 | Chillar et al. |
| 2015/0331932 A1* | 11/2015 | Georges ............ G06F 17/30601 382/225 |

OTHER PUBLICATIONS

International Search Report & Written Opinion dated Feb. 10, 2016 in Patent Cooperation Treaty Application No. PCT/US2015/065365, filed Dec. 11, 2015.

Böhme et al., "Models and Measures for Correlation in Cyber-Insurance," Workshop on the Economics of Information Security (WEIS), Jun. 2006, Retrieved from <http://www.econinfosec.org/archive/weis2006/docs/16.pdf>.

* cited by examiner

DIVERSITY ANALYSIS WITH ACTIONABLE FEEDBACK METHODOLOGIES

CROSS-REFERENCE TO RELATED APPLICATION

This application is a Continuation-in-Part of U.S. patent application Ser. No. 14/585,051 (now issued as U.S. Pat. No. 9,253,203), filed Dec. 29, 2014, entitled "Diversity Analysis with Actionable Feedback Methodologies", which is hereby incorporated by reference herein in its entirety including all references and appendices cited therein.

FIELD OF THE PRESENT TECHNOLOGY

The present technology relates generally to systems and methods for determining metrics, such as diversity or similarity, between entities and the application of those metrics as actionable feedback loops which can be used to increase diversity or reduce similarity amongst groups of entities. These metrics may relate to diversity of aggregate cyber security risk for use in planning or filtering new entities so as to increase that diversity.

SUMMARY

Embodiments of the present technology include a method, comprising: (a) for each of a plurality of entities, receiving a set of variables that are indicative of attributes of an entity; (b) comparing the sets of variables for the plurality of entities to each other; (c) locating clusters of similar variables shared between two or more of the plurality of entities; (d) determining a probable maximum loss for the plurality of entities that share the clusters, the probable maximum loss comprising a loss value attributed to a cyber event against one or more of the shared variables; (e) receiving, using a processor coupled to a memory, feedback from an end user in response to providing the probable maximum loss to the end user; (f) automatically converting, using the processor and in response to the feedback, the probable maximum loss to an updated probable maximum loss; and (g) providing one or more actions to the end user based on the probable maximum loss and the clusters of similar variables, enactment by the end user of at least one of the one or more actions decreasing the probable maximum loss.

Other embodiments of the present technology include a method, comprising: (a) for each of a plurality of entities, receiving a set of variables that are indicative of attributes of an entity; (b) receiving from an end user, a selection of variables that comprise a subset of the set of variables that the end user desires to analyze; (c) comparing the subsets of variables for the plurality of entities to each other; (d) locating clusters of similar variables shared between two or more of the plurality of entities; (e) determining a probable maximum loss for the plurality of entities that share the clusters, the probable maximum loss comprising a loss value attributed to a cyber event against one or more of the shared variables; and (f) providing, using a processor coupled to a memory, one or more actions to the end user based on the probable maximum loss and the clusters of similar variables, enactment by the end user of at least one of the one or more actions decreasing the probable maximum loss.

Additional embodiments of the present technology include a system, comprising: (a) a processor; and (b) a memory for storing executable instructions, the processor executing the instructions to: (i) compare sets of variables for a plurality of entities to each other, each of the sets of variables being indicative of attributes of an entity; (ii) locate clusters of similar variables shared between two or more of the plurality of entities; (iii) calculate a probable maximum loss for the plurality of entities that share the clusters by: (1) determining singular vulnerabilities of each of the plurality of entities; (2) determining vulnerabilities of pairs of the plurality of entities; and (3) performing a randomized scenario analysis using the singular and pairwise vulnerabilities, the probable maximum loss comprising a loss value; (iv) receive, using the processor, feedback from an end user in response to providing the probable maximum loss to the end user; (v) automatically convert, using the processor and in response to the feedback, the probable maximum loss to an updated probable maximum loss; and (vi) provide one or more actions to the end user based on the probable maximum loss and the clusters of similar variables, enactment by the end user of at least one of the one or more actions increasing the probable maximum loss.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
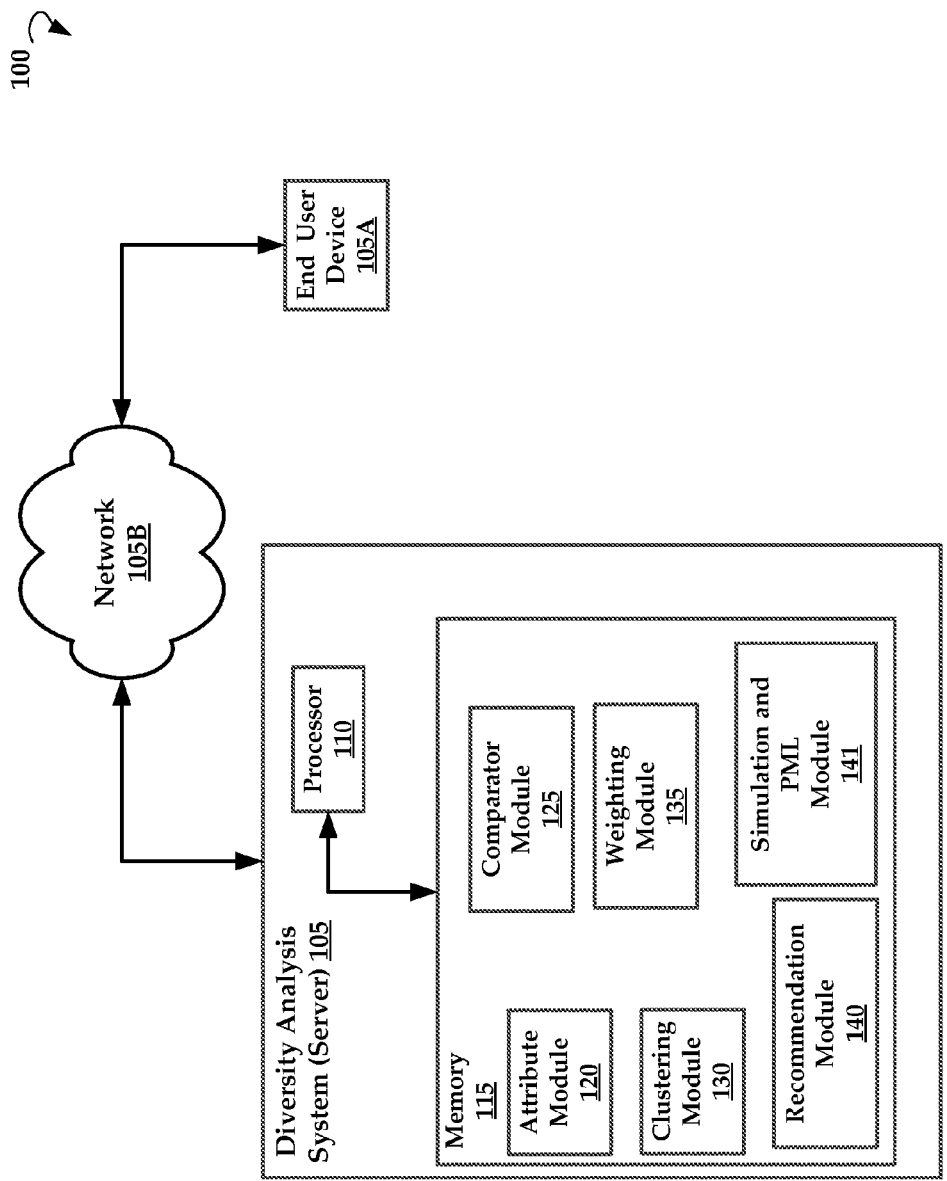
FIG. 1 is a high level schematic diagram of computing architecture for practicing aspects of the present technology.

Various embodiments of the present technology are directed to systems and methods for determining diversity and/or similarity between entities with respect to risk, e.g., cyber security risk, and the utilization of these metrics in various ways to improve diversity between the analyzed entities. In one embodiment, an insurer may desire to understand the diversity of their insured entities with respect to aggregate cyber risk and utilize a measure of diversity to prevent too much similarity between insured entities, and/or to compare their diversity to their industry peers. Additionally, reinsurers, rating agencies and/or insurance brokers may also utilize the present technology. For example, reinsurers may want to compare one insurer's portfolio to another insurer's to buy, invest, and/or cover. Brokers may wish to review their portfolio of clients, and ratings agencies may review an insurer's portfolio and use it to provide a rating on the financial strength rating of the insurer. To be sure, cyber insurance and other insurance risks can be a function of similarity. For cyber insurance risk, if insured entites are very similar to one another in a variety of key attributes such as revenue, clientele, industry, technology utilized such as cloud computing service provider, content delivery network (CDN) provider, operating system, firewall vendor, intrusion detection system vendor, security services provider, etc., or other factors, a loss, e.g., due to a cyber attack, by one of these insured entities might imply that other insured entities having similar attributes will also experience a loss. For example, a plurality of web hosting provider may source their servers from the same company. A cyber attack of that company's servers may equally affect all of these web hosting providers that use the server, and consequently affect an insured that utilizes one of those web hosting providers to host the insured's website and other web services.

To be sure, diversity in attributes between entities can decrease the likelihood that a covered loss by any particular entity will also likely affect the other entities. Thus, the desire is to have the insured entities be as diverse as possible in the aggregate, to reduce overall risk. Conversely, similarity of attributes between insured entities can increase risk for the insurer.

Using the present technology, an end user may determine similar attributes shared between pluralities of entities. These shared attributes can be aggregated into clusters to locate groups of entities with shared attributes. In one example, several entities use the same content delivery network (CDN), the same cloud service provider, a similar website traffic profile, have overlapping executives, and report similar revenue. While these entities may also share attributes with other entities, these attributes are used in various embodiments to create a cluster or grouping of entities that, when considered in the aggregate, have a low diversity score due to the similarities in this example.

End users may use the present technology to learn their aggregate cyber risk compared to industry peers and use that information to, for example, screen potential target entities for inclusion into a group based upon how the potential addition of their attributes to the group would affect the diversity score for the end user's collection of entities. In alternative exemplary embodiments, the system may instead of, or in addition to, outputting a diversity or clustering score, may output a different value analyzing the entites, for example, a probable maximum loss (PML) and/or an expected portfolio value.

The present technology can be used to analyze diversity/similarity between many entities. The diversity/similarity analyses can use hundreds and even thousands of attributes, looking for diversity or commonality therebetween. In some instances, the end user can adjust the attributes and/or select which attributes are important to them and the system will analyze only these attributes when determining diversity, e.g., a diversity score for aggregate cyber risk.

While the examples above mention the suitability of the present technology for use with insurance planning, in general, and cyber insurance planning, in particular, the present technology is not so limited. Other examples of technologies that can implement the present technology are financial portfolio managers, technology companies that desire infrastructure robustness, human resources, venture capital investment, and so forth.

These and other advantages of the present technology are provided below with reference to the collective drawings.

FIG. 1 is a high level schematic diagram of a computing architecture (hereinafter architecture 100) of the present technology. The architecture 100 comprises a diversity analysis system 105 (hereinafter also referred to as system 105), which in some embodiments comprises a server or cloud-based computing device configured specifically to perform the diversity analyses described herein. That is, the system 105 is a particular purpose computing device that is specifically designed and programmed (e.g., configured or adapted) to perform any of the methods described herein.

The system 105 can be coupled with end user device 105A, such as computer, tablet, Smartphone, or other similar end user computing device. End users can interact with the system 105 using their end user device 105A. The end user device 105A and system 105 can be coupled using a network 105B.

A suitable network 105B may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

In one embodiment, the system 105 comprises a processor 110 and memory 115 for storing instructions. The memory 115 can include an attribute module 120, a comparator module 125, a clustering module 130, a weighting module 135 and a recommendation module 140. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

For context, the diversity analyses according to various embodiments of the present technology begin with input for the attribute module 120. A set of variables that are indicative of attributes of an entity may be input into the attribute module 120. In one embodiment, the variables can include technologies a company might employ (e.g., internally and externally for Internet communication such as e-mail, website, and social media online presence) such as CDN provider, cloud service provider, server type, OS type, visitor traffic knowledge, customer profiles, as well as other non-technical information such as revenue, number of employees, years in business, and so forth. In various embodiments, the breadth and type of variables that can be analyzed and correlated are unlimited. In some embodiments, the breadth and type of variables that can be analyzed and correlated for the company and for their industry peers, for comparision, may be limited by breadth and type of information that is available at online sources concerning the same. Again, an end user can define or specify the types of variables that are of interest to them.

For example, if the end user is an insurer, the insurer may desire to know how diverse their insured entities are with respect to cyber security risk relative to a wide and divergent set of variables. In regard to a cloud computing provider, for example, interest in such diversity may be only in technological variables such as traffic, page views, bandwidth, and other variables related to cyber risk.

In some embodiments, entites and end users can access and interact with the system 105 using a variety of graphical user interfaces (GUIs) such as a dashboard, including various elements as described herein. The system 105 can use the dashboard to display messages or notifications as well as diversity scores, similarity scores, and/or recommendations.

The system may gather variables for an entity by querying the entity for information, scraping available online sources such as websites, corporate filings, news sources, other public record databases and resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. The data collecting device may be on the company's network and/or its periphery, and may collect and/or analyze the data, while also transmitting it to system 105. In this manner, additional, proprietary data may be gleaned from a particular entity's network. Regardless of how the variables are obtained, the variables are input into the attribute module 120. The attribute module 120 can format or normalize the input as needed for consistency.

In one embodiment, the comparator module 125 is executed to perform a variable comparison on all or a subset of the variables. The comparison can be for all or only a subset of all entities. The subset of variables can be selected by the end user, as well as the entities analyzed.

The comparator module 125 is configured to identify variables shared between entities or groups of entities. The implications of this analysis are multifaceted. For instance, the same variable can be shared between many entities, which leads to an inference that a particular variable might be problematic. This lack of diversity is a more pointed or granular lack of diversity.

In another example, multiple variables are shared between numerous entities. This diversity relationship between the entities signifies a more prolific lack of diversity.

Localized commonality can be found between small groups (even between two) entities. This type of similarity can be inferred as less problematic than the more prolific examples provided above where similarity exists between numerous entities.

The comparator module 125 can cooperate with the clustering module 130 to create commonality clusters (e.g., various clusters of commonly shared variables). In one embodiment, if five entities are being analyzed, many different clusters can be identified. By example, if variables A-D are being analyzed with respect to entities 1-5, the comparator module 125 finds commonality between entities 1 and 3 with respect to variables B and C. Also, the comparator module 125 finds commonality between entities 1-5 with respect to variable A. Other similar correlations can be found.

The clustering module 130 can display to the end user these commonality clusters, which indicate areas of non-diversity. Also, these commonality clusters can be utilized by the recommendation module 140 to create action items for the end user that if enacted would change the diversity score. Details regarding the diversity score are found in greater detail below.

In some embodiments, the comparator module 125 creates a diversity score or index. This diversity score represents how dissimilar the analyzed group of entities is relative to one another in view of their variables.

The diversity score can include a percentage of the overall number of compared variables that are dissimilar to those that are shared. The diversity score can be represented variously as a fraction, a decimal, or a percentage, and may be included in the graphical user interface (e.g., dashboard.) Additionally, or alternatively, the diversity score may be normalized into a number within a user-defined, or predefined, range, similar to a credit score.

In some embodiments, the comparator module 125 can cooperate with the weighting module 135 to applying a weighting to one or more variables. In one embodiment, the weighting is selected by an end user such as an insurer. For example, an insurer determines that industry serviced, gross revenue, and customer country of origin are important variables to analyze, e.g., for assessing individual and aggregate cyber risk. For instance, if the insurer knows that gross revenue is very important to the calculation, the insurer can specify that the gross revenue variable is to be given greater importance in the analysis than other variables. In another example, the insurer can assign a weight to each variable based upon importance.

In some embodiments, the system can determine weightings and variables based on industry knowledge acquired, and use machine learning, big data and other "tools" to make an "educated" determination. For example, the weighting of variables can also be determined by the system 105 based on information such as actuarial data, industry practices, or other rules established by end users but which are intended to be applied by default. The selection of a weighting schema by the system 105 can be based on variables for the entities. For example, if the system 105 determines that the entities are all physicians, the system 105 can select weightings that are appropriate for medical practices or hospitals. Such determinations by the system may be adjusted and/or otherwise specified by the end user (e.g., using the dashboard) to tailor them for their particular circumstances, preferences, or other factors.

In some embodiments, the diversity score can be represented as a diversity graph that illustrates the connection between entities. Entities can be graphically connected based on commonality of variables between entities. For example, certain entities may be connected as being banks that present particularly enticing targets for cyber criminals and thus particular cyber risks.

In response to calculating a diversity and/or similarity score, the recommendation module 140 can be executed to provide the end user with some type of actionable feedback. For example, the recommendation module 140 can provide the end user one or more actions to the end user based on the diversity score and the clusters of similar variables. These one or more actions potentially increase the diversity score if enacted by the end user.

In one example, the recommendation module 140 can automatically identify variables, which if changed, would affect the diversity score. For example, if the entities are or utilize technology company service providers that use a particular CDN, the recommendation module 140 can output a recommendation that diversification in this area would be beneficial. The end user can alert the entities and encourage them to explore other options for CDNs. If the end user is an insurer, for example, the insurer can encourage this change by offering rate concessions to the insured entities. Various embodiments of the system thus may automatically provide the diversity score or other information to the end user regarding diversity, which the end user can utilize to encourage or effect various changes (e.g. via rate concession, screening of potential new entities, adjusting rates based on diversity, or other actions prompted by the system's determinations.) The diversity score might also be used to inform the insurer as to which polices should be renewed and which polices should not be renewed. For example, if a potential new (target) entity to add presents an unacceptable cyber risk, based on the diversity analysis, the insurer may choose not to provide the entity' policy or to provide the policy at a rate commensurate with the risk.

In another example, the recommendation module 140 can identify problematic common variables that negatively impact diversity scores. For example, the recommendation module 140 may identify shared infrastructure such as CDNs and cloud service providers as particularly problematic variables that are commonly shared between several entities. In some embodiments, the recommendation module 140 can also identify network traffic, network traffic patterns, firewalls, firewall policies that are commonly shared. Changing these shared variables would likely increase the diversity score for these entities. Conversely, the recommendation module 140 can determine key variables that if changed would negatively affect a diversity score. The recommendation module 140 can identify these variables to the end user as desirable.

Actions that could be taken in response to this information could include a project plan that specifies that the insurer is to find new customers that do not share these problematic variables. Likewise, the project plan could also or alternatively specify that the insurer is to find new customers that do share key positive variables.

In one example, an action includes the recommendation module 140 creating and providing the end user with a variable profile of a target entity that when added to the plurality of entities increases the diversity score. For example, the recommendation module 140 could create a profile for a prototypical new client that is in a different technology sector or a completely different industry sector. In another embodiment, the recommendation module 140 could create a profile for a prototypical new client that includes desirable variables, rather than merely a client that excludes certain disfavored variables.

In one embodiment, the recommendation module 140 can provide the end user with a list of entities of the plurality of entities that are lowering the diversity score. Again, as mentioned above, certain clusters of variables may be found in common between entities. Certain ones of these clusters may have more of a negative impact on the diversity score than others. For example, commonality between headquarters or domicile may have no impact on the diversity score, even if this variable is shared in common between several entities. On the other hand, commonality in gross revenue or average employee age may have a drastic impact on the diversity score for one reason or another. To be sure, commonality of a variable(s) does not always negatively affect the end user or the end user's business. In these instances the commonality can be ignored or weighted so as not to affect the calculated diversity score.

In another example, the recommendation module 140 can provide the end user with a list of entities of the plurality of entities that, if lost would lower the diversity score, which can prompt the end user to take action to avoid.

In another example, action the recommendation module 140 can compare a variable profile for a new entity to determine if the addition of the new entity to the analysis will negatively or positively impact the diversity score of the group.

For example, the attribute module 120 can receive a variable profile for a new entity and parse out the variables which are indicative of attributes of the new entity. This profile could include an application form, a survey, or any other content that is capable of conveying variables.

Next, the comparator module 125 adds a set of variables of the new entity to the comparison described above and repeats the calculation of the diversity score. The recommendation module 140 can alert the end user if the addition of the new entity decreases the diversity score. The recommendation module 140 can alert the end user if the addition of the new entity increases the diversity score as well.

In some embodiments, the recommendation module 140 updates the diversity score based on feedback received from the end user. For example, if the end user wants to view how the addition of a proposed new client will affect an existing diversity score, the profile for the new client is added to the system and the variables for the new client are processed and added to the comparison process. A new or updated diversity score is calculated and displayed to the end user.

The difference between the new diversity score and the old diversity score is expressed as a diversity delta. In some embodiments, the system 105 can apply thresholds to the diversity delta to determine if a proposed change to the entity grouping is sufficient to warrant the proposed change. For example, the system 105 may require at least a net change or diversity delta of 20%. Other percentages can also be utilized. The present technology provides information related to the updated information (the new diversity score), including differences (the amount of the change made in one or more updates, namely the delta), and trends (patterns over many time steps).

The present technology also provides attribution information when a diversity score changes. In particular, the methods and system indicate to a user why the score has changed, namely what exactly has changed in the underlying data sets to effect that higher level score change. In this manner, the systems and methods of the present technology provide detailed information to the user to identify the changed data, and thereby understand the positive and negative impacts of the user's actions on the diversity score.

The system 105 can also build an entity portfolio for an end user with knowledge gained from an analysis of variables for a plurality of entities. For instance, the system 105 can create a report that informs the end user as to how many and what type of entities a portfolio should have to be balanced in terms of diversity, e.g., with respect to cyber risk. For example, the report may indicate that an insurer should have a certain percentage of clients in the banking sector, a certain percentage in the technology sector, and a certain percentage in the medial industry. These sectors of the portfolio are deduced by comparing variables for various entities in a given industry that lead to a suitable diversity score.

It will be understood that the diversity score can be counterbalanced by other factors such as revenue for the end user. That is, an insurer may be more likely to accept a lower diversity score from a group of entities that pay higher premiums or a group of entities that is at least partially self-insured.

Figure 2:
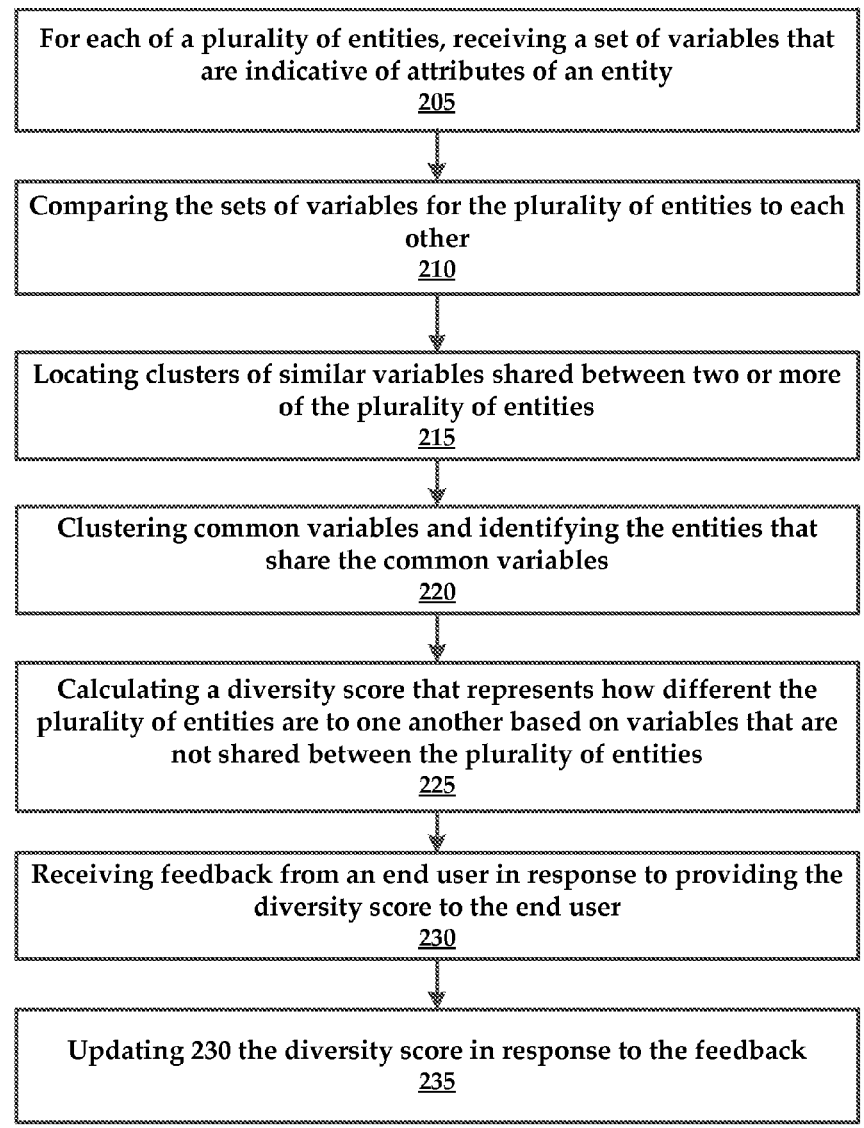
FIG. 2 is a flowchart of an example method for determining entity diversity.

FIG. 2 is a flowchart 200 of an example method that is executed by the system, in accordance with the present technology. The method includes the system 105 (for each of a plurality of entities), receiving 205 a set of variables that are indicative of attributes of an entity. These variables can include any number or type of variables that represent the attributes of the entity.

These variables are collected for numerous entities that may belong, in some embodiments, to a particular class or group. For example, the entities could include all employees in a company, all insured customers of an insurance agency, investors in a mutual fund, or other groups.

The method includes the system 105 comparing 210 the sets of variables for the plurality of entities to each other and locating 215 clusters of similar variables shared between two or more of the plurality of entities.

The method includes the system 105 clustering 220 common variables and identifying the entities that share the common variables. These clusters are indicative of non-diversity between these entities.

Next, the method includes the system 105 calculating 225 a diversity score that represents how different the plurality of entities are to one another based on variables that are not shared between the plurality of entities. This diversity is directly related to the commonality discovered above. The more similar or commonly shared variables exist, the less diverse the entities are relative to one another, as a general rule. Again, as mentioned above, some variables will have little to no impact on diversity as dictated by weighting or variable selection by the end user. For example, if a commonly shared variable is not included in the diversity calculation by the end user the variable has no impact on the diversity score.

Next, the method includes the system 105 receiving 230 feedback from an end user in response to providing the diversity score to the end user. Also, the method includes the system 105 updating 235 the diversity score in response to the feedback.

Various types of feedback are contemplated and illustrated in FIG. 2. The feedback can take the form of a suggestion, option, report, or other output that is actionable by the end user. Exemplary methods and systems according to the present technology may also provide benchmarking over time. In this manner, an insurance company or other entity tracking aggregate cyber risk may track their diversity score over an adjustable time period, for example days, weeks, months, and/or years.

It will be understood that the methods illustrated in flowchart form are susceptible to execution in various forms such that not all steps may be required. In some instances, additional steps can be added. Some steps may be rephrased or replaced with other steps, in accordance with the claimed technology.

Figure 3:
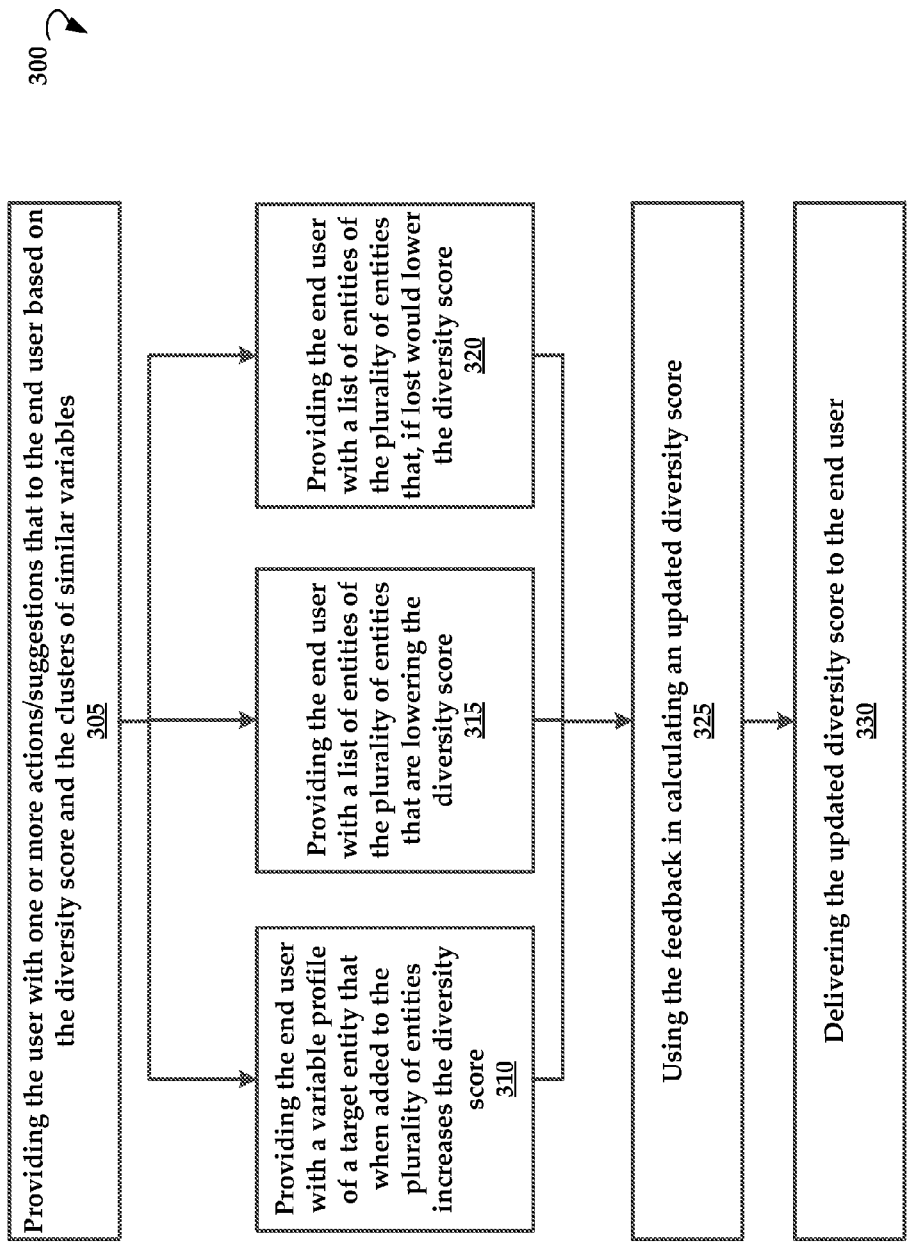
FIG. 3 is a flowchart of an example action and feedback loop method for updating a diversity score and improving client diversity.

In FIG. 3, the flowchart 300 illustrates the method including the system 105 providing, at 305, the user with one or more actions/suggestions that to the end user based on the diversity score and the clusters of similar variables. These actions can potentially increase the diversity score if enacted by the end user.

In step 310, an action includes providing the end user with a variable profile of a target entity that when added to the plurality of entities increases the diversity score.

In step 315, an action includes providing the end user with a list of entities of the plurality of entities that are lowering the diversity score.

In step 320, an action includes providing the end user with a list of entities of the plurality of entities that, if lost, would lower the diversity score.

Regardless of the action taken (step 310, 315, and/or 320), the feedback is used in calculating, at step 325, an updated diversity score and delivering, at step 330, the updated diversity score to the end user.

Again, these options are merely examples and are not intended to be limiting. These options can be provided individually or in combination, if desired.

Figure 4:
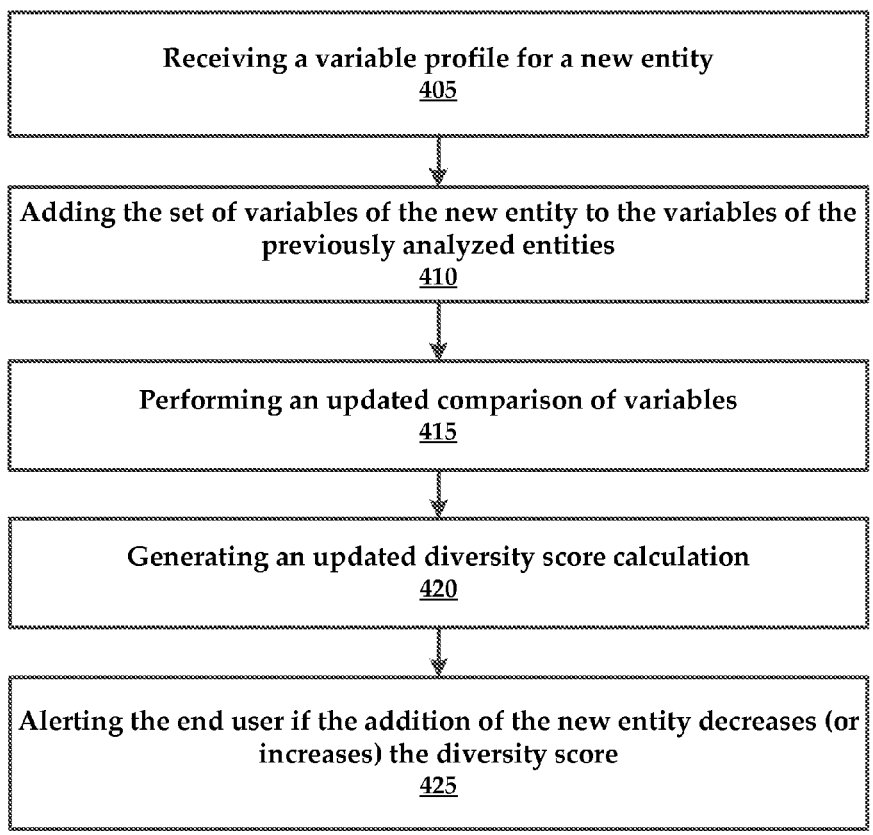
FIG. 4 is a flowchart of a method for analyzing a new client's impact on an existing diversity calculation.

FIG. 4 is a flowchart 400 of a new entity analysis method. In this method, the system is utilized to compare the variables of a new entity to an existing diversity analysis. For example, an insurer desires to determine how the addition of this new entity will affect the diversity of an existing client base. This aggregate risk analysis can be used to ensure that diversity is maintained or increased when a new client is added to an existing pool of clients.

The method includes receiving 405 a variable profile for a new entity. The variable profile either includes a set of variables or a set of variables is deduced from the variable profile. As mentioned above, the variable profile can include an application form, a resume, a corporate filing such as a tax return, or any other document that includes attributes of an entity.

Next, the method includes adding 410 the set of variables of the new entity to the variables of the previously analyze entities and performing 415 an updated comparison of variables. Next, the method includes generating 420 an updated diversity score calculation.

In some embodiments, the method includes alerting 425 the end user if the addition of the new entity decreases (or increases) the diversity score.

The end user can decided to accept or reject this new client based upon how the client affects the diversity score.

Advantageously, the present technology can be used in scenarios where diversity of clientele is desirous. The present technology can perform diversity analyses on potentially thousands of attributes across countless entities in ways that would be impossible to accomplish absent the use of the diversity analysis system. The diversity analyses of the present technology can bring clarity to business planning and project management, where integration of new clients/entities may affect the diversity of a current client base (either positively or negatively). Where diversification is desirable or required, the present technology provides a means for facilitating and maintaining this diversity in a way that is actionable and usable to the end user. That is, the present technology provides a way for end users to mitigate risk through diversification of their customer base or however diversity impacts their particular business or operations.

Figure 5:
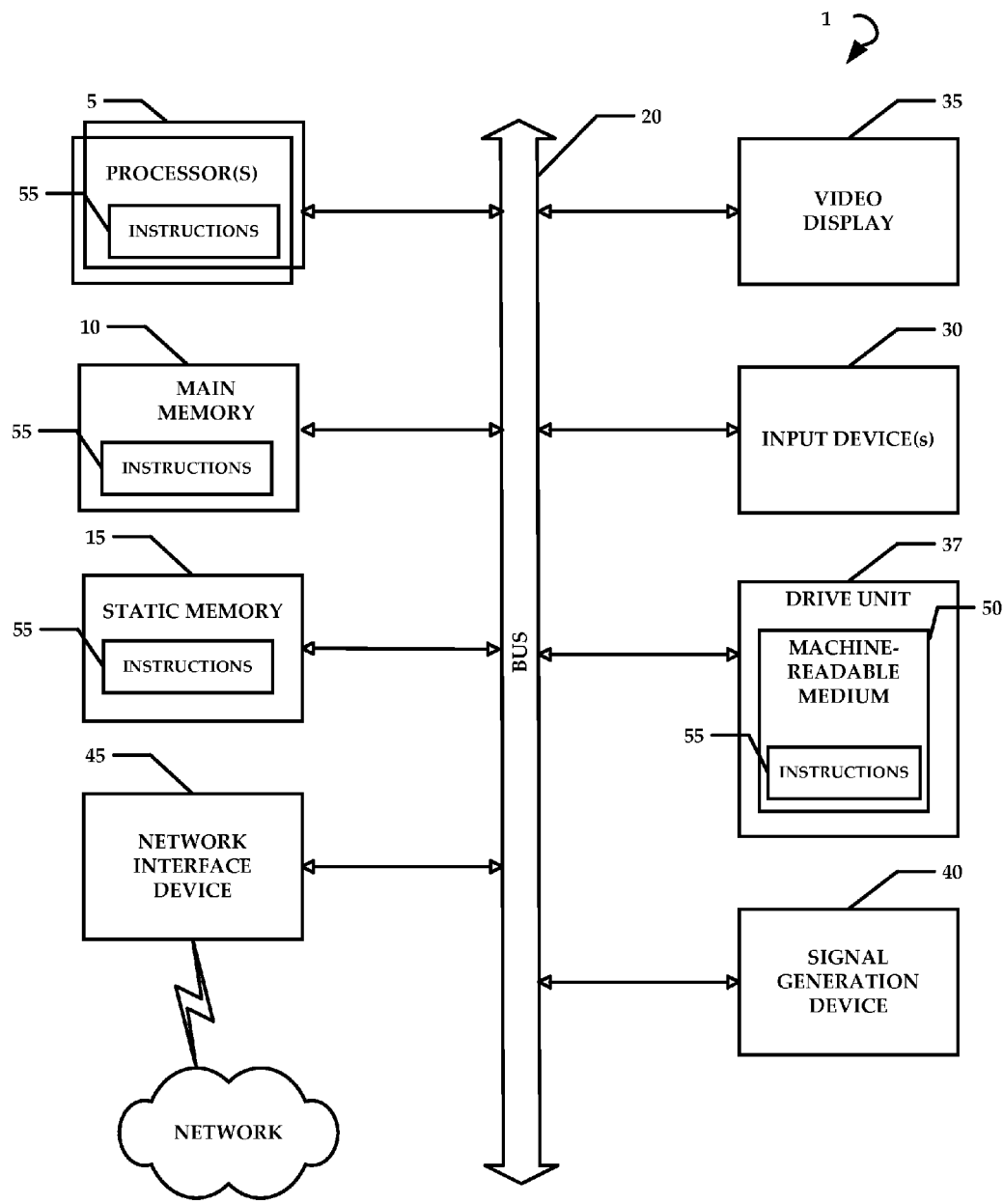
FIG. 5 is a schematic diagram of a computing system that is used to implement embodiments according to the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (see e.g. 105B in FIG. 1) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like.

Furthermore, those skilled in the art may appreciate that the Internet service may be coupled to one or more databases, repositories, servers, and the like, which may be utilized in order to implement any of the embodiments of the disclosure as described herein.

According to some embodiments, the present technology can be utilized to calculate a probable maximum loss (PML) for a portfolio of companies in a cyber risk pool. The PML value can include a loss value calculated against various probability likelihood values. For example, a PML probability likelihood value could include 1/10, 1/20, 1/100, or 1/1,000. To be sure, other likelihood values can also likewise be utilized in some embodiments. The smaller the likelihood value, the lower the probability of a loss event and vice versa. In some instances, a smaller likelihood value can be correlated with a cyber risk event or scenario that is not likely to occur, but nevertheless if it were to occur, it would result in a higher PML value than a cyber risk event that is more likely to occur. In one non-limiting example, a smaller likelihood value could be associated with the breach or failure of three out of five shared services between a group of companies. While this type of scenario is unlikely to occur, the PML of this type of event would be greater than what would occur if the loss only involved a single service.

In general, the present technology can be configured to calculate one or more PML values for entities in a cyber risk insurance portfolio. If the PML risk is too great, the mixture of entities within the cyber risk insurance portfolio can be selectively altered and updated PML values calculated. In this way, desired permutations of entities can be placed into a cyber risk insurance portfolio so as to maximize optimal PML values, according to various embodiments. To be sure, the lower the PML values are across the board, the better for the insurer.

In some embodiments, these tactics can be utilized by a large company to analyze its utilization of technology services, non-technology vendors, and business partners amongst its constituent operations and selectively adjust the services to reduce a cyber risk for the company.

As background, cyber security exposure can be analyzed to increase awareness of these threats and assess the impact on an organization's financial strength. Insurers can and will be required to provide detailed information on their specific cyber security insurance policies. Through the utilization of various techniques, various embodiments of the present technology can aggregate exposures and arrive at a probable maximum loss (PML) in the foreseeable future for an insurer or a company.

A quantification of the aggregation paths among service providers, vendors, business partners or insurance policyholders across the cloud-based continuum of services ranging from shared infrastructure to software as a service, other types of service providers, and common exploitable vectors of attack will be crucial to an insurer's or a company's ability to understand and manage the aggregation of risk within their portfolio or operations.

Cyber security exposure is relevant with respect to how a company is protecting itself against cyber security threats, both internal and external. Various embodiments of the present technology provide various methods for determining and aggregating such exposure and calculating PML measurements. These may be used, for example, for underwriting cyber security insurance and other uses.

The present technology, according to various embodiments, provides methodologies which examine aggregate exposures and potential disaster scenarios involving correlated cyber risk. These exemplary methods can be crucial to insurance companies with portfolios of cyber insurance policies and companies with complex supply chains and business partner networks.

It will be understood that the interconnectedness of cyber risk among companies is not necessarily correlated to attributes like physical location and class of business, so carriers must act accordingly and take a more thorough look at the businesses they are underwriting when examining potential aggregated loss scenarios affecting their portfolio. An understanding of a portfolio's exposure to major service providers and other common vectors of attack are beneficial and require adequate analysis for the potential catastrophe scenarios on various insured companies to arrive at reliable measurements of PML.

Figure 6:
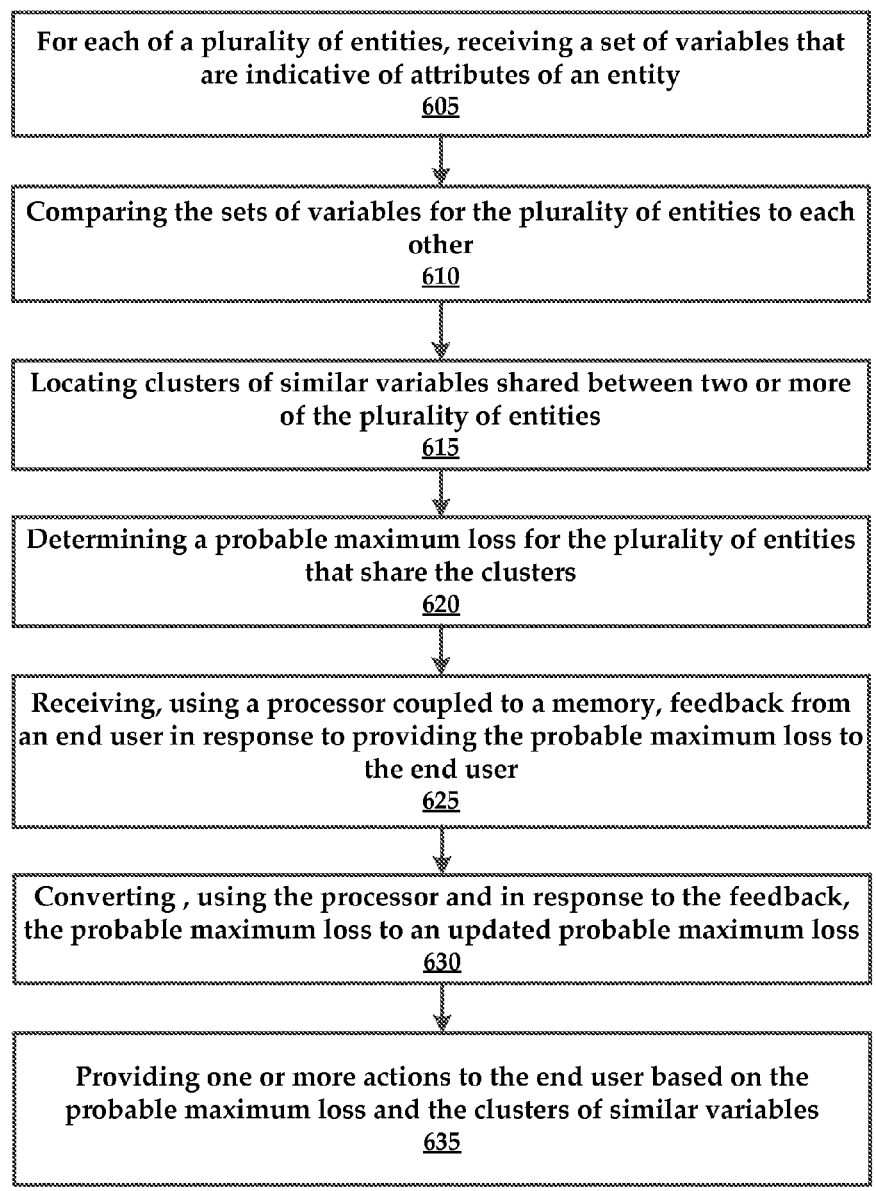
FIG. 6 is a flowchart of an example method for determining a probable maximum loss value for a portfolio of entities.

FIG. 6 illustrates a flowchart 600 for an exemplary method for determining a probable maximum loss for a group of entities, according to various embodiments. As mentioned above, these entities can be selected for inclusion in a possible insurance pool. The selected entities can also comprise entities already in an insurance pool and insured for cyber risk. As also mentioned above, the exemplary method can also be utilized to help large organizations or companies determine a probable maximum loss across an organization by comparing the services utilized by various parts of an organization and performing a random simulation analysis to calculate PML. The company can then adjust the distribution and use of services, recalculate PML and determine if an increase or decrease in PML is caused by these redistribution/reorganization efforts.

Thus, the exemplary method implicitly includes a process for identifying a plurality of entities that are or may be included in a cyber risk insurance policy.

The exemplary method in the flowchart 600 begins with, for each of a plurality of entities, receiving, at 605, a set of variables that are indicative of attributes of an entity. These variables may include, but are not limited to, for example: content delivery network utilized, ISP usage, cloud storage service providers, database technology, any other hardware or software services, as well as non-technology services utilized by the entities.

Next, the exemplary method can comprise comparing, at 610, the sets of variables for the plurality of entities to each other and locating, at 615, clusters of similar variables shared between two or more of the plurality of entities. Thus, entities can be aggregated into groups based on their shared utilization of services. By way of just one example, each of the selected entities may be determined to use Amazon™ AWS and be aggregated based on this shared variable. To be sure, according to various embodiments, many correlations can be determined for the entities based on one or more shared variables.

Next, the exemplary method can include determining, at 620, a probable maximum loss for the plurality of entities that share the clusters. As mentioned above, the probable maximum loss can comprise a (monetary) loss value attributed to a cyber breach or other cyber event, against one or more of the shared variables. Again, the PML may be calculated with respect to a probability or likelihood for failure or breach of the shared variables. For one non-limiting example, calculating PML with respect to a probability or likelihood for a breach of Amazon™ AWS. According to various embodiments, the PML will be higher if multiple services are involved in a failure or cyber event, and less if fewer services are breached. Likewise, if the likelihood of a shared service being breached is low, the PML may be affected according to various embodiments. According to various embodiments, for example, if the likelihood of a service being breached is low, but the damage would be widespread, the PML will be higher than if there is a high likelihood for a breach but limited damage.

Once the PML is known, actions can be taken to decrease the PML, if needed. For example, the method can include receiving, at 625, using a processor coupled to a memory, feedback from an end user in response to providing the probable maximum loss to the end user. The feedback can include removing, replacing, or adding entities to the calculation that affect the calculation of an updated PML.

Next, the method can include automatically converting, at 630, using the processor and in response to the feedback, the probable maximum loss to an updated probable maximum loss.

According to some embodiments, the method includes providing, at 635, one or more actions to the end user based on the probable maximum loss and the clusters of similar variables. To be sure, enactment by the end user of at least one of the one or more actions may decrease the probable maximum loss. Again, an action could include adding, removing, and/or replacing entities within the group of entities that were analyzed to generate the PML value according to various embodiments.

Figure 7:
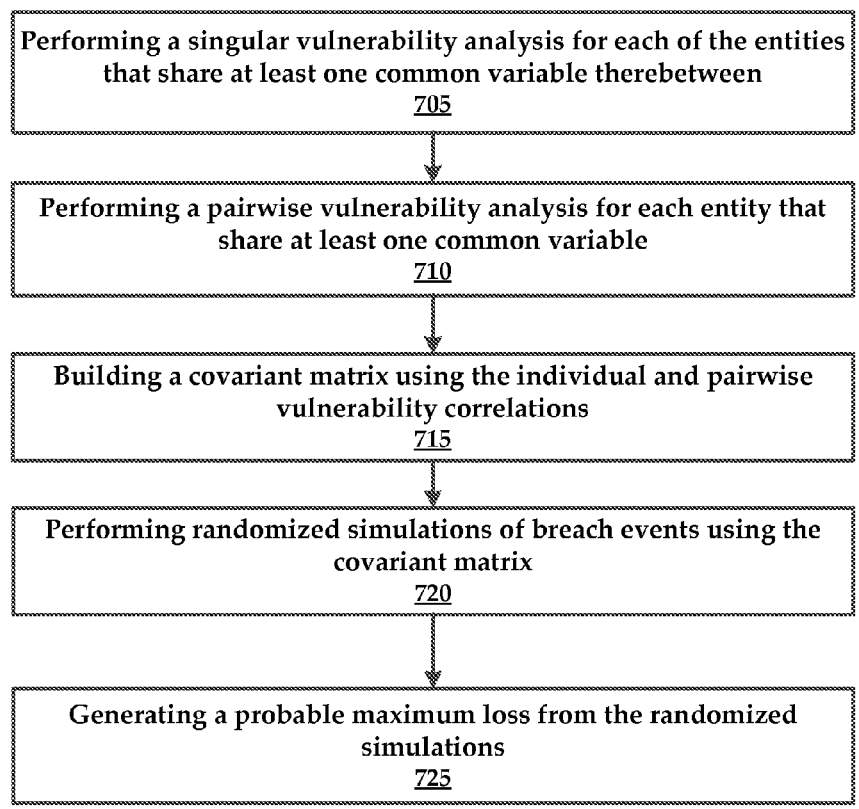
FIG. 7 is a flowchart of another example method for determining a probable maximum loss value for a portfolio of entities.

FIG. 7 illustrates a flowchart 700 for an example method for calculating PML, in one embodiment. The method comprises performing, at 705, a singular vulnerability analysis for each of the entities that share at least one common variable therebetween. That is, each entity will have a set of variables that represent the services or attributes. These services or attributes can lead to an increase or decrease in the likelihood that the entity will experience a cyber event or loss. The method, according to various embodiments, provides an analysis of each entity individually to determine their vulnerability.

Next, the exemplary method includes performing, at 710, a pairwise vulnerability analysis for each entity in the group. Thus, vulnerability may be determined for each entity in comparison with every other entity, that share at least one common variable, in the group. This step can also be referred to as a pair-wise correlation.

Both steps 705 and 710 can produce areas of interest that can be utilized as the focus of a PML analysis, as described below. That is, according to various embodiments, both individual and pairwise vulnerabilities are indicative of potential group-wise vulnerabilities, which are in turn indicative of losses that can be expected for the selected group of entities as a whole.

Figure 8:
FIG. 8 is a diagram illustrating an example pairwise correlation matrix and a corresponding example covariance matrix.

In some embodiments, the method can comprise building, at 715, a covariant matrix using the individual and pairwise vulnerability correlations. FIG. 8 is an exemplary diagram 800 illustrating an example pairwise correlation matrix and a corresponding example covariance matrix. Diagram 800 shows just a non-limiting example embodiment of a way correlated risks may be represented and incorporated into a PML calculation based on the diversity analysis and score.

According to some embodiments, the method includes performing, at 720, randomized simulations of breach events using the covariant matrix and generating, at 725, a probable maximum loss.

As mentioned above, some embodiments include a feedback loop where entities are added, removed, and/or replaced to change the vulnerability analyses, covariant matrix assembly, and PML calculation. In one example, a Monte Carlo analysis can be utilized to perform a randomized simulation on the covariant matrix.

Figure 9:
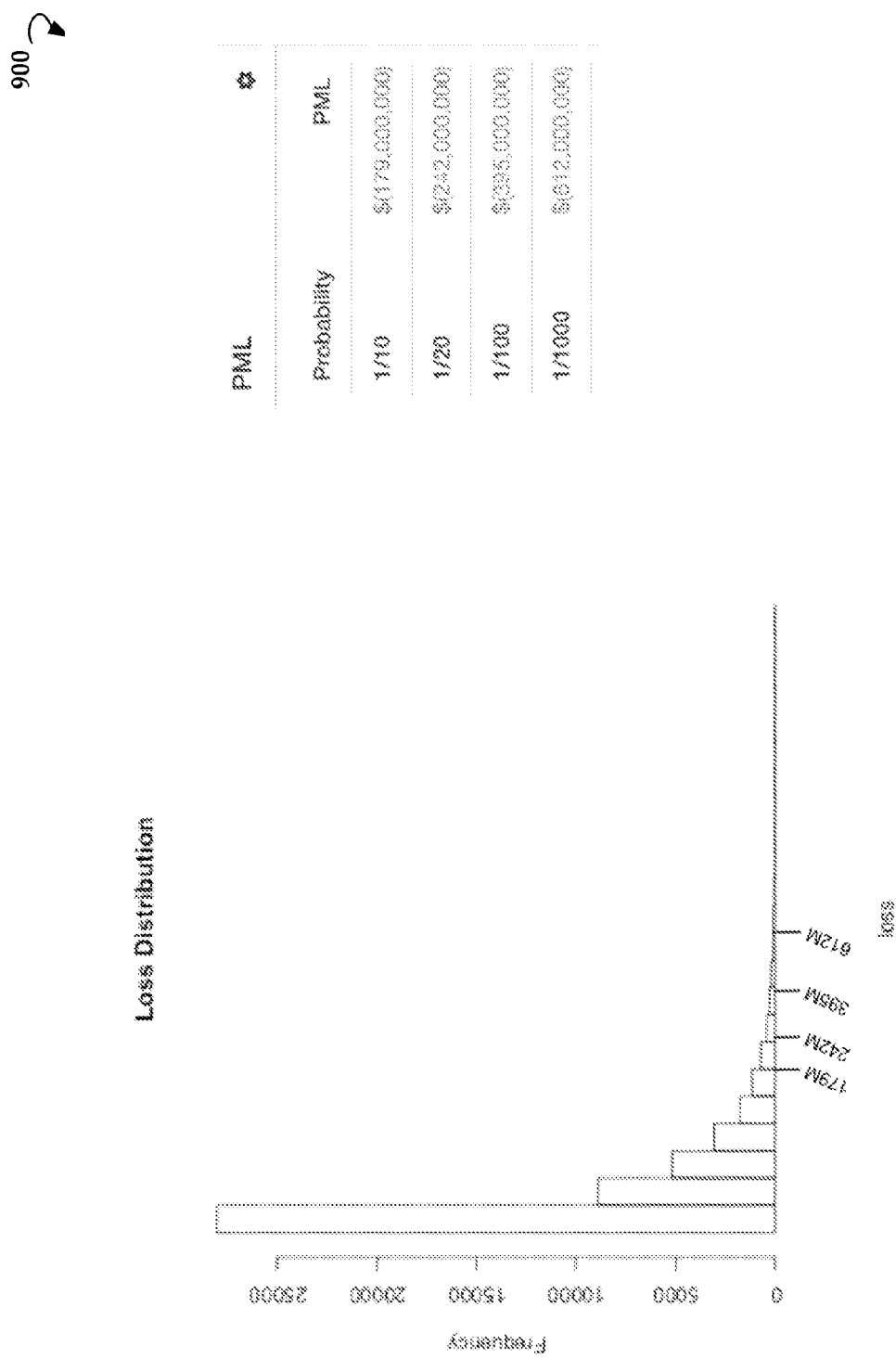
FIG. 9 is a diagram illustrating an example distribution with markings showing the corresponding values in an example PML table.

In various embodiments, the PML calculation may be a distribution of losses (where each loss in that distribution corresponds to a simulated state). The calculation itself can be related to the diversity score of the portfolio via the correlation/covariance matrix in various embodiments. FIG. 9 is a diagram 900 illustrating an example distribution with markings showing the corresponding values in an example PML table.

According to some embodiments, the PML value can include a PML that includes every breach likely or expected for the plurality of entities over a period of time, such as a month or year. Again, the likelihood of the breach event affects the PML calculated according to various embodiments. If events that have a 1 in 10 chance of occurring are considered, their contribution to the PML, according to various embodiments, is likely lower than a breach event having a likelihood of occurrence of 1 in 1,000 or 1 in 10,000.

It will be understood that since the PML calculation process uses randomized simulations (using Monte Carlo analysis, for example) on a covariant matrix, other randomized simulations may lead to the generation of PML values that are not identical to one another. Thus, the exemplary method can optionally include performing a plurality of randomized simulations against the same covariant matrix and obtaining a plurality of PML values. An average or other statistical representation of the plurality of PML values can be obtained if desired.

It will be understood that the system of FIG. 1 can be adapted to perform the methods described herein. For example, the system 100 can further comprise a simulation and PML module 141 that is stored in memory 115. The simulation and PML module 141 can perform the individual and pairwise analyses, as well as the covariant matrix construction and random simulation processes. Also, the simulation and PML module 141 can be configured to calculate the PML values from the covariant matrix construction and random simulation processes.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   for each of a plurality of entities, receiving a set of variables that are indicative of attributes of an entity;
   comparing the sets of variables for the plurality of entities to each other;
   locating clusters of similar variables shared between two or more of the plurality of entities;
   determining a probable maximum loss for the plurality of entities that share the clusters, the probable maximum loss comprising a loss value attributed to a cyber event against one or more of the shared variables;
   receiving, using a processor coupled to a memory, feedback from an end user in response to providing the probable maximum loss to the end user;
   automatically converting, using the processor and in response to the feedback, the probable maximum loss to an updated probable maximum loss; and
   providing one or more actions to the end user based on the probable maximum loss and the clusters of similar variables, enactment by the end user of at least one of the one or more actions decreasing the probable maximum loss; the providing of one of the one or more actions comprising providing the end user with a list of a subset of entities of the plurality of entities that, if the subset of entities was removed from the plurality of entities, the probable maximum loss is lowered.

2. The method according to claim 1, wherein the probable maximum loss is calculated for a likelihood value that represents how likely the cyber event is for the one or more of the shared variables.

3. The method according to claim 1, wherein determining a probable maximum loss further comprises:
   determining a likelihood of the cyber event for each of the plurality of entities; and
   performing a pairwise analysis of the likelihood of the cyber event for all pairs of the plurality of entities.

4. The method according to claim 3, wherein determining a probable maximum loss further comprises performing a randomized scenario analysis for the plurality of entities.

5. The method according to claim 1, further comprising calculating a diversity score that represents how different the plurality of entities are from one another based on variables that are not shared between the plurality of entities.

6. The method according to claim 5, further comprising:
   receiving feedback from the end user in response to providing the diversity score to the end user; and
   updating the diversity score in response to the feedback.

7. The method according to claim 6, wherein the diversity score comprises a determination of diversity with regard to aggregate cyber security risk, the cyber security risk including risks associated with computer networks, the diversity score being configured at least for planning for increasing diversity to reduce the aggregate cyber security risk.

8. The method according to claim 7, further comprising calculating a similarity score based on the clusters of similar variables.

9. The method according to claim 1, wherein the set of variables are selected by the end user.

10. The method according to claim 1, wherein each of the set of variables is provided with a weight that affects how the probable maximum score is calculated.

11. The method according to claim 10, further comprising receiving, from the end user, an adjustment to the weight of the one of the set of variables.

12. The method according to claim 1, wherein an action of the one or more actions comprises providing the end user with a variable profile of a target entity that, when added to the plurality of entities, decreases the probable maximum loss.

13. The method according to claim 1, wherein an action of the one or more actions comprises providing the end user with a list of entities of the plurality of entities that are increasing the probable maximum loss.

14. The method according to claim 1, further comprising:
   receiving a variable profile for a new entity;
   adding a set of variables of the new entity to the comparison and probable maximum loss calculation; and
   alerting the end user if the addition of the new entity decreases a diversity score.

15. The method according to claim 6, further comprising determining common local attributes shared between two or more of the plurality of entities.

16. A method, comprising:
for each of a plurality of entities, receiving a set of variables that are indicative of attributes of an entity;
receiving from an end user, selection of variables that comprise a subset of the set of variables that the end user desires to analyze;
comparing the subsets of variables for the plurality of entities to each other;
locating clusters of similar variables shared between two or more of the plurality of entities;
determining a probable maximum loss for the plurality of entities that share the clusters, the probable maximum loss comprising a loss value attributed to a cyber event against one or more of the shared variables; and
providing, using a processor coupled to a memory, one or more actions to the end user based on the probable maximum loss and the clusters of similar variables, enactment by the end user of at least one of the one or more actions decreasing the probable maximum loss; the providing of one of the one or more actions comprising providing the end user with a list of a subset of entities of the plurality of entities that, if the subset of entities was removed from the plurality of entities, the probable maximum loss is lowered.

17. The method according to claim 16, wherein an action of the one or more actions comprises removal or replacement of one or more of the plurality of entities with a replacement entity that comprises different variables.

18. The method according to claim 16, wherein the probable maximum loss is calculated for a likelihood value that represents how likely the cyber event is for the one or more of the shared variables.

19. The method according to claim 16, wherein determining a probable maximum loss further comprises:
determining a likelihood of the cyber event for each of the plurality of entities; and
performing a pairwise analysis of the likelihood of the cyber event for all pairs of the plurality of entities.

20. The method according to claim 19, wherein determining a probable maximum loss further comprises performing a randomized scenario analysis for the plurality of entities.

21. The method according to claim 16, wherein an action of the one or more actions comprises providing the end user with a variable profile of a target entity that, when added to the plurality of entities, decreases the probable maximum loss.

22. The method according to claim 16, wherein an action of the one or more actions comprises providing the end user with a list of entities of the plurality of entities that are increasing the probable maximum loss.

23. A system, comprising:
a processor; and
a memory for storing executable instructions, the processor executing the instructions to:
compare sets of variables for a plurality of entities to each other, each of the sets of variables being indicative of attributes of an entity;
locate clusters of similar variables shared between two or more of the plurality of entities;
calculate a probable maximum loss for the plurality of entities that share the clusters by:
determining singular vulnerabilities of each of the plurality of entities;
determining vulnerabilities of pairs of the plurality of entities; and
performing a randomized scenario analysis using the singular and pairwise vulnerabilities, the probable maximum loss comprising a loss value;
receive, using the processor, feedback from an end user in response to providing the probable maximum loss to the end user;
automatically convert, using the processor and in response to the feedback, the probable maximum loss to an updated probable maximum loss; and
provide one or more actions to the end user based on the probable maximum loss and the clusters of similar variables, enactment by the end user of at least one of the one or more actions decreasing the probable maximum loss; the providing of one of the one or more actions comprising providing the end user with a list of a subset of entities of the plurality of entities that, if the subset of entities was removed from the plurality of entities, the probable maximum loss is lowered.

24. The system according to claim 23, further comprising:
generating a covariant matrix using the individual and pairwise vulnerability correlations; and
performing randomized simulations using the covariant matrix to generate the probable maximum loss.

25. The system according to claim 23, wherein the one or more actions comprises removal or replacement of one or more of the plurality of entities with a replacement entity that comprises different variables.

26. The system according to claim 23, wherein the probable maximum loss is calculated for a likelihood value that represents how likely the cyber event is for the one or more of the shared variables.

27. The system according to claim 23, wherein determining a probable maximum loss further comprises:
determining a likelihood of a cyber event for each of the plurality of entities; and
performing a pairwise analysis of the likelihood of a cyber event for all pairs of the plurality of entities.

28. The system according to claim 23, wherein determining a probable maximum loss further comprises performing a randomized scenario analysis for the plurality of entities, wherein a Monte Carlo analysis is used for at least one of the randomized scenario analyses.

* * * * *